P. BRADY.
SPRING WHEEL.
APPLICATION FILED DEC. 21, 1915.
1,212,180.
Patented Jan. 16, 1917.
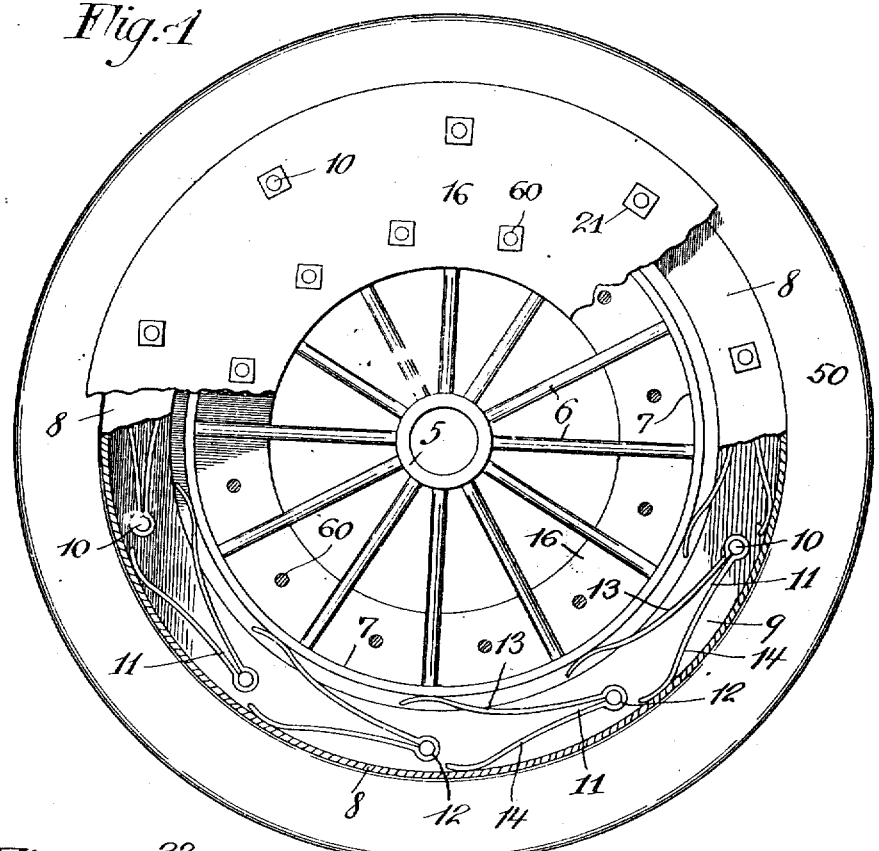
Fig. 1
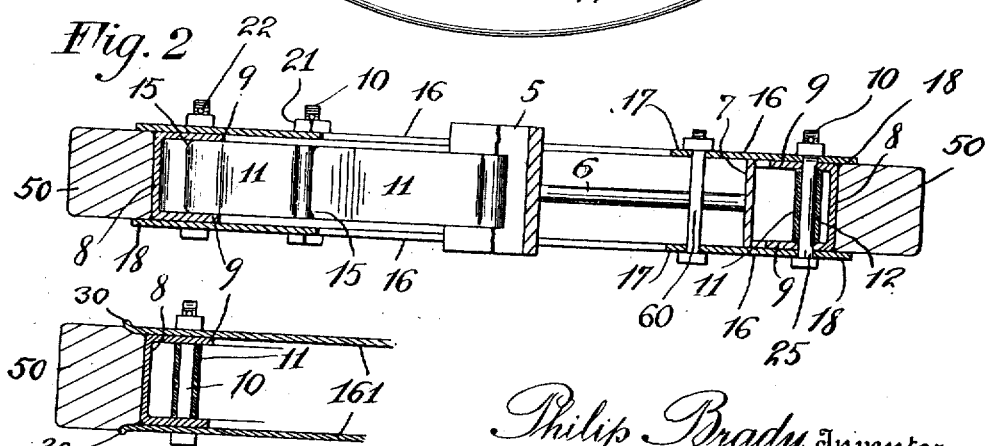
Fig. 2
Fig. 3
Philip Brady Inventor
By his Attorney

UNITED STATES PATENT OFFICE.

PHILIP BRADY, OF NEW YORK, N. Y.

SPRING-WHEEL.

1,212,180.  Specification of Letters Patent.  Patented Jan. 16, 1917.

Application filed December 21, 1915. Serial No. 67,973.

*To all whom it may concern:*

Be it known that I, PHILIP BRADY, a citizen of the United States, and resident of the city of New York, in the county of New York and State of New York, have invented certain new and useful Improvements in Spring-Wheels, of which the following is a specification.

This invention relates to improvements in spring wheels and the object of the invention is to improve the construction of spring wheels and to provide a simple, practical and generally improved spring wheel of relatively inexpensive construction adapted for use with motor or other vehicles.

Other objects of the invention will appear as this specification proceeds.

Accordingly, my invention is embodied in a spring wheel comprising such parts and elements arranged and combined as hereinafter described and claimed and as illustrated in the accompanying drawing in which—

Figure 1 is a view in elevation, with parts in section of a spring wheel embodying my invention. Fig. 2 is a substantially transverse sectional view of the wheel, and Fig. 3 shows a modified flange construction.

The spring wheel comprises two main elements, an inner wheel and an outer rim member. The inner wheel consists of the hub 5, the spokes 6 and the felly 7, all of which may be of any suitable material and construction adapted for the vehicle with which the wheel is to be used.

The spring rim member consists of the rim, preferably in the form of a channel 8. Through the sides 9 of the said channel pass the bolts 10 which are spaced equally circumferentially in the rim. Upon each bolt 10 is mounted a double leafed spring 11 comprising the socket portion 12 surrounding the bolt and the inner and outer leaves 13 and 14 which are adapted to bear against the said felly 7 and the channel 8 respectively. The springs are of a width to fill the channel and are preferably rounded at the corners 15 to reduce wear.

Outside the channel 8 on each side thereof, there are provided retaining flanges 16, 16 which extend inwardly over the wheel felly as at 17 and extend outwardly as at 18 to serve as tire securing means for the solid rubber tire 50. The felly 7 of the wheel is wide enough to fill the space between the flanges 16 as shown. The retaining flanges are clamped to the rim by the bolts 10 aforesaid and nuts 21 which may be locked by pins 22 or other suitable means.

The springs 11 are bent in the form of a V and the tension of the spring leaves 13 and 14 upon the wheel and rim respectively is relied upon for transmitting the power from the wheel to the rim under ordinary conditions. It may happen, however, that the action of the springs is not sufficient for this purpose and I therefore provide means, as the bolts 60 in the retaining flanges 16 and spaced between the spokes 6. In case the wheel should turn without also turning the rim at the same time, the bolts 60 will take against the spokes and drive the rim, the springs then acting only as resilient elements between the wheel and the rim.

In assembling the wheel, one of the flanges 16 may be laid on the ground with the bolts inserted therein and pointing upward. The bolts may be squared as at 25 to fit into squared holes in the flange to prevent turning. Thereafter the rim 8 is slipped into place over the bolts, the wheel is placed inside the rim and the springs 11 inserted within the channel and on the bolts. Next the tire may be put on and finally the other flange 16 is secured in position and the nuts screwed down on the bolts. The wheel is then ready for use.

It will be noted as one of the features of this invention that the wheel is entirely disconnected from the rim member. That is, the wheel floats on the springs. Consequently, when a load is put upon the wheel, only the lower springs are compressed, while the upper springs expand and act upon the wheel to depress it upon the lower springs. The absence of physical connecting means between the wheel and the rim member makes for greater resiliency as will be understood. At the same time, the springs are strong enough to prevent slipping of the wheel thereon under ordinary circumstances.

The outer retaining flanges take up the side thrusts from the wheel and such side thrusts are not communicated to the springs which are confined within the channel and therefore may be and in this case are mounted upon the bolts in a manner to permit them to rotate or move slightly on the bolts to provide self adjustment of the pressure by the spring leaves. In addition to their function of retaining the wheel in engagement with the springs and within the rim, the said side retaining flanges serve to keep the tire 50 on the rim as is clearly shown. The tire is easily removed by simply detaching one of the flanges 16.

Fig. 3 shows a modified construction in which the retaining flanges are in the form of disks 161 to prevent dirt from getting into the rim and the edges 30 are curved outwardly to accommodate a wider tire.

The contact points of the spring leaves with the wheel and the rim may be staggered as shown or may be on a radial line.

Other details of construction and changes in design may be made without departing from the spirit of the invention and the scope of the appended claim.

I claim:—

A spring wheel comprising an inner wheel and an outer rim disconnected from said inner wheel, a plurality of springs interposed between said rim and wheel, each of said springs consisting of a socket portion and two spring leaves pointing in the same direction and in frictional engagement only with the said rim and wheel, removable flanges for retaining the said inner wheel within the plane of the said outer rim, bolts for securing said flanges to the rim, said bolts passing through the socket portion of the springs for positioning the latter on the said rim.

Signed at New York in the county of New York and State of New York this 20th day of December A. D. 1915.

PHILIP BRADY.